Patented Mar. 11, 1941

2,234,551

UNITED STATES PATENT OFFICE 2,234,551

PREPARATION OF LACTONES

Charles Collaud, Geneva, Switzerland, assignor to the firm Givaudan-Delawanna Inc., New York, N. Y.

No Drawing. Application December 31, 1937, Serial No. 182,815. In Great Britain January 4, 1937

10 Claims. (Cl. 260—344)

This invention relates to the preparation of cyclic lactones of large cycle and an object of the invention is to provide an improved process for the preparation of these substances.

It is known that such lactones cannot be obtained by the usual methods of esterification, since these methods lead to the production of polymeric esters of high molecular weight. Thus, an oxy-acid of general formula

where R represents a chain of more than five carbon atoms, is transformed, when heated, into a polymerised self-ester of general formula

However, it is known that different processes have been proposed for the preparation of monomeric lactones containing more than seven atoms in the cycle. Thus, lactones of large cycle may result from a suitable oxidation of carbocyclic ketones (Helv. Chim. Acta 11 1159 (1928)). These same lactones may be obtained by making metallic oxides act under the influence of heat on ω-halogenated fatty acids or by heating salts of these acids in inert solvents (German Patent No. 449,217 of March 6, 1926, granted August 25, 1927).

Two processes of greater technical interest have formed the subject of recent patents.

1. The process described in French patent specification No. 773,651 of September 3, 1934, permits of "the preparation of lactones having a great number of links and comprising at least eleven carbon atoms in the heterocyclic nucleus, from oxy-carbonic acids of the formula OH.R.CO.OH, in which R is any aliphatic radical, but which contains at least eleven carbon atoms connected in open chain, or from functional derivatives of these acids. This process consists essentially in that these acids, or their functional derivatives, are subjected to hot lactonization in a strongly diluted homogeneous solution, or in the form of vapour of low partial tension." French patent of addition No. 46,623 of April 25, 1936, extends the invention to the case where the radical R″ still contains at least one oxygen atom bound as in an ether." This process, which therefore consists in obviating or reducing the formation of polymers by the use of intensive dilution, is also covered by English Patent No. 448,708 of December 12, 1933, which claims a process "for the manufacture of cyclic esters, including lactones, having more than seven carbon atoms, by known general reactions as hereinbefore defined, characterized in that the reaction is effected in the presence of an inert liquid which is a solvent for the reaction materials and in an amount not less than twenty times, and preferably not less than one hundred times greater than that of the reaction materials." The examples given in these different specifications show that it is indicated to use dilutions of the order of a thousand times the quantity of the reagents employed.

2. French Patents No. 768,807 of May 28, 1934, and No. 796,410 of January 22, 1936, relate to the preparation of cyclic esters, including lactones of large cycle, by depolymerisation of the corresponding polyesters. This depolymerisation is effected by heating under reduced pressure in the presence of various catalysts.

It has been found that it is possible to obtain simply and with excellent outputs lactones of large cycle without the necessity of passing through the intermediary stage of polymers.

It is known that, generally speaking, if there be placed under the action of heat, in the presence of certain catalysts (for example, alkaline alcoholates), esters resulting from the condensation of an alcohol R′.OH with an oxy-acid HO.R.CO.OH, the alcohol R′.OH is eliminated with the formation of polymeric self-esters of the oxy-acid HO.R.CO.OH.

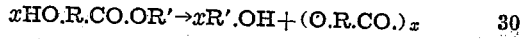

If the alcohol R′.OH is readily volatile, it may be eliminated by distillation in proportion as it is formed and only a mixture of polymerised self-esters finally obtained.

Now, it has been found that it is easy to obtain a cyclic lactone instead of mixture of polymers; for this purpose, it is sufficient to make this lactone the most volatile of the constituents present or even to make the lactone such that it may be carried along by the vapours of the alcohol R′.OH. Therefore, for the esterification of the oxy-acid OH.R.CO.OH. an alcohol R′.OH is chosen which complies with one of those two conditions. The lactone is eliminated from the system in proportion as it is formed.

In a more general manner, it has been found that it is possible to prepare lactones having a great number of links by reactions bringing about exchange of functional groupings inside a molecule of the ester of an oxy-acid, provided that the lactone sought for is the most volatile of the constituents of the system or provided that it may be carried away by one of the by-products of the reaction. It is eliminated from the system by distillation or by entrainment in proportion as it is formed.

It will be understood that an inert constituent may be added to the system if it permits of a more ready separation of the lactone.

The difficultly volatile alcohol R'.OH may advantageously be used in excess. It may be monovalent or polyvalent. It is sufficient for it to comply with the conditions of volatility indicated above and to be of sufficient stability at the temperature at which the reaction is brought about. For example, in the processes hereinafter described, the esters employed in the reaction may form an alcohol R'.OH which has a boiling point above 140° C. under a reduced pressure of 5 mm. Internal ethers of polyvalent alcohols such as the polyethylene-glycols, are also suitable.

The catalysts which enable the reaction to take place are the classic catalysts bringing about exchange of functional groupings between esters or between esters and alcohols, that is to say, in particular alkaline catalysts. The sodium derivative of the alcohol R'.OH used is quite naturally indicated. The scope of the invention is not, however, limited to the use of these particular catalysts.

Should the lactone be the most volatile of the constituents the reaction is effected in a distilling apparatus permitting of the separation of the cycle derivative in proportion as it is formed, the alcohol R'.OH formed remaining in the apparatus. Should the vapours of the alcohol R'.OH serve to carry away the cyclic lactone use is made of a suitable device permitting of the separation of the two products by decanting or by extraction, or in any other manner, and by returning the alcohol R'.OH into the apparatus.

It is preferable to effect the reaction under reduced pressure. The pressure also varies with the nature of the alcohol R'.OH and the temperature to which it is desired to bring the reaction. With regard to the temperature, it is not necessary for it to surpass 150 to 200° C. It is chosen so that the reaction is rapid and is not accompanied by decomposition.

According to one aspect of the present invention therefore a process for the preparation of cyclic lactones having a large number of links, without the necessity of passing through the intermediary state of polymers is provided, consisting of any exchange of functional groupings capable of producing such lactone under conditions in which it is the most volatile of the constituents of the system, or in which it may be carried away by a by-product of the reaction, or by any inert substance added for this purpose.

Embodiments of the present invention are described in the following examples:

Example 1

One prepares the glycerol mono-ester of hydroxy - 16 - oxa-12 - hexadecanoic - 1 acid
$$HO.(CH_2)_4.O.(CH_2)_{10}.CO.OCH_2.CH.(OH)CH_2.OH$$
by condensing the sodium salt of this acid, in solution in the glycerol, with the chlor-1-propanediol-2,3; 0.5 mol. (174 grammes) of this ester, washed in water and dried, are charged into a distilling apparatus provided with a condenser followed by a decanter, permitting of the separation of the distilled products, lactones and glycerol, the latter being able to return to the apparatus. To the product, 300 cc. of glycerol containing 3 grammes of sodium in solution are added. 230 cc. of glycerol are distilled in the decanter under absolute pressure of 3 mm. and the entrainment is continued by maintaining the glycerol in the decanter at a constant level. The temperature measured in the distiller is maintained at about 190° C. The operation is interrupted at the end of five hours. From the distillate, decanted and washed in water, there is obtained by distillation 103 grammes of pure monomeric lactone.

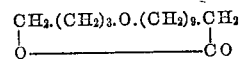

(0.4 mol).

The residues of the entrainment are entirely soluble in water. By saponification 14 grammes of hydroxy-16-oxa-12-hexadecanoic-1 acid (0.05 mol) are withdrawn.

This lactone is an oil which possesses a musk odour. It boils at 143° C./3 mm. Its density at 20° C. is 0.983 and the refractive index $n_D^{20°}=1.4678$.

Example 2

The glycerol ester of the hydroxy-15-pentadecanoic acid prepared by condensing the sodium salt of this acid with chlor-1-propanediol-2,3 is easily transformed with a good yield into the corresponding lactone of the formula:

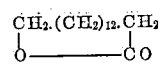

when it is treated under conditions analogous to that of the preceding example. In this case the lactone carried by the glycerol forms small crystals. The separation of them can be facilitated by adding to the decanting vessel a small quantity of a solvent which is little volatile such as the para-cymene.

Example 3

The glycerol ester of the hydroxy-14-methyl-13-tetradecanoic acid prepared by condensing the chlor-1-propanediol-2,3 with the sodium salt of this acid is mixed with 0.3 gr. sodium methylate and the mixture distilled under a reduced pressure of 3 mm. During the distillation anhydrous glycerol is added to maintain the temperature in the liquid mass between 210° and 220° C. After 5 hours the distillate (200 cc.) is diluted with water and extracted by ether. The ethereal solution is washed with a diluted solution of sodium carbonate and the residues obtained by elimination of the ether are rectified. One obtains in this way the lactone of the following formula:

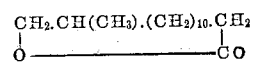

This lactone is a colourless oil, which possesses a strong musk odour. It distills at 137° C./3 mm. The density at 20° C. is 0.955 and the refractive index $n_D^{20°}=1.4711$.

Example 4

The glycerol ester of the hydroxy-15-methyl-3-oxa-13-pentadecanoic acid is treated under the conditions of Example No. 3. One obtains in this way a lactone of the following formula:

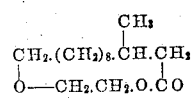

This lactone is an oil which possesses a musk odour. It boils at 146° C./3 mm. Its density at 25° C. is 0.982 and the refractive index $n_D^{25°}$= 1.4665.

*Example 5*

By using the glycerol ester of the hydroxy-15-oxa-12-hexadecanoic acid of the following formula:

$$CH_3.CH(OH).CH_2.CH_2.O.(CH_2)_{10}.CO.OH$$

and treating it under the conditions described in the above mentioned Examples Nos. 1, 2, 3 and 4, one obtains the corresponding lactone:

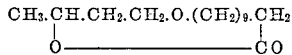

which constitutes an oil with a strong musk odour distilling at 150° C./4.5 mm. Its density at 20° C. is $$D_4^{20}=0.9780$$

and its refractive index $n_D^{20}$=1.4650 at 20° C.

The present invention also covers lactones having a larger number of links, when prepared or produced by a process in accordance with the present invention.

What I claim is:

1. Process for making a cyclic lactone containing from 12 to 18 carbon atoms in the lactone ring, which comprises heating an ester of a hydroxy-acid in the presence of a functional group exchange catalyst, said ester of the hydroxy-acid having the general formula HO—R—CO—O—R′, where R represents an aliphatic radical with 11 to 17 carbon atoms in the chain and R′ represents the radical of an alcohol, R′OH, said alcohol boiling at a temperature at least sufficiently high with respect to the boiling point of the lactone to carry with it substantially all the lactone from the reaction chamber continuously as the latter is formed.

2. Process for making a cyclic lactone containing from 12 to 18 carbon atoms in the lactone ring, which comprises heating an ester of a hydroxy-acid in the presence of a functional group exchange catalyst, said ester of the hydroxy-acid having the general formula HO—R—CO—O—R′, where R represents an aliphatic radical with 11 to 17 carbon atoms in the chain and R′ represents the radical of an alcohol, R′OH, said alcohol boiling at a temperature at least as high as the lactone formed.

3. Process according to claim 1, in which an inert substance is added to the reaction mixture.

4. Process according to claim 1 in which the alcohol R′OH is glycerol, $C_3H_5(OH)_3$.

5. Process for the making of a cyclic lactone containing from 12 to 18 carbon atoms in the lactone ring, which comprises heating an ester of a hydroxy-acid in the presence of an alkali metal alcoholate, said ester of the hydroxy-acid having the general formula HO—R—CO—O—R′, where R represents an aliphatic radical with 11 to 17 carbon atoms in the chain and R′ represents the radical of an alcohol, R′OH, said alcohol boiling at a temperature at least sufficiently high with respect to the boiling point of the lactone to carry with it substantially all the lactone from the reaction chamber continuously as the latter is formed.

6. Process for making a lactone containing from 12 to 18 carbon atoms in the lactone ring which comprises heating an ester of a hydroxy-acid in the presence of a sodium salt of glycerol, said ester of the hydroxy-acid having the general formula HO—R—CO—O—$C_3H_5(OH)_2$, where R represents an aliphatic radical with 11 to 17 carbon atoms in the chain.

7. Process according to claim 1 in which the esters employed in the reaction form an alcohol R′.OH which has a boiling point above 140° C. under a reduced pressure of 5 mm.

8. Process according to claim 1 in which the esters employed in the reaction form an alcohol R′.OH which has such a boiling point above 140° C. under a reduced pressure of 5 mm. that its vapors carry off the cyclic lactones continuously as they are formed in the reaction mixture.

9. Process according to claim 1 in which the esters employed in the reaction form an alcohol R′.OH which has such a boiling point above 140° C. under a reduced pressure of 5 mm. that the cyclic lactones formed are the most volatile constituents present in the reaction mixture and therefore may be carried off continuously through distillation as they are formed.

10. Process according to claim 1 in which the esters employed in the reaction are heated in the presence of an alkaline catalyst.

CHARLES COLLAUD.